Jan. 28, 1969          G. M. EDGE ET AL          3,423,845
                       TYPEWRITER TRAINER
Filed Nov. 22, 1965                              Sheet _1_ of 3
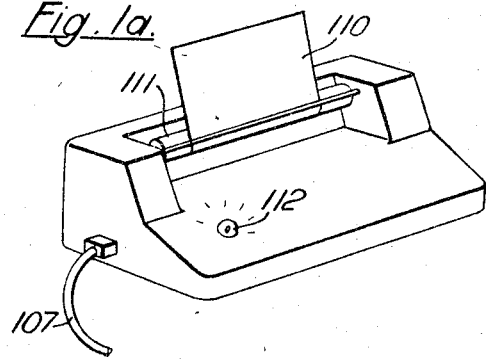
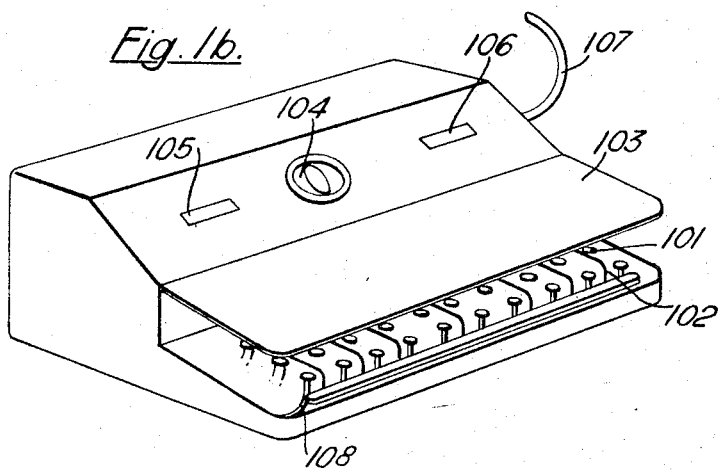

United States Patent Office 3,423,845
Patented Jan. 28, 1969

3,423,845
TYPEWRITER TRAINER
Gordon Malcolm Edge, Haslingfield, Timothy March Beaupre Eiloart, Cambridge, Ivan S. Horabin, Barrington, and Peter John Wynn Rayner, Cambridge, England, assignors, by mesne assignments, to Kee, Incorporated, Baltimore, Md., a corporation of Maryland
Filed Nov. 22, 1965, Ser. No. 509,108
Claims priority, application Great Britain, Nov. 27, 1964, 48,413/64; Mar. 8, 1965, 9,808/65
U. S. Cl. 35—6          8 Claims
Int. Cl. G09b 13/02

ABSTRACT OF THE DISCLOSURE

An apparatus for use in learning keyboard skills including a keyboard, a comparator, a source containing elements of information representing characters stored in a predetermined manner, and a permanent display of the characters stored in the source, in which when a key on the keyboard is operated signals are sent from both the source and the keyboard to the comparator and when a key is operated in accordance with the sequence of characters appearing in the graphic display, an output is obtained from the comparator giving a first indication, while when a key is operated not in accordance with the said sequence an output is obtained from the comparator giving a different indication which is delayed in time in accordance to the rate at which keys have been operated in the correct sequence.

---

This invention relates to an apparatus for use in learning keyboard skills, to methods of its operation, and to a number of features associated with the apparatus.

According to one aspect of the invention there is provided a keyboard, a source of information, and a comparator by means of which the sequence of operation of the keys is compared with the sequence of the presentation of the information from the source.

In a development of the invention a signal from the comparator may be used to give an indication to an operator within a given time when a key has not been operated in the correct sequence. This indication may for example be given by illuminating a representation of the key that should have been struck in an illustration of the keyboard visible to the operator, and the illumination may be produced as a result of a further action on the part of the operator.

According to yet another aspect of the invention there is provided means to guide the fingers so that the likelihood of a key being struck by the wrong finger is reduced.

According to yet a further feature of the invention means is provided to indicate to the operator the "home keys" upon which the fingers should rest.

Embodiments of the invention will now be described with reference to the accompanying drawings in which:

FIG. 1a shows a perspective view of an apparatus for holding an exercise and providing a display.

FIG. 1b shows a perspective view of a keyboard apparatus associated with the apparatus shown in FIG. 1a.

Figure 2A:
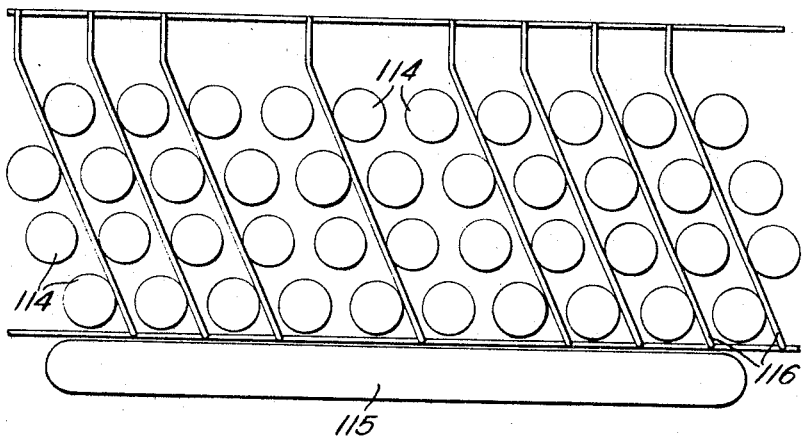
FIG. 2 shows at (a), (b) and (c) the plan, end, and front elevation views of a keyboard.

Referring to FIGS. 1a and 1b there is shown a typewriter keyboard 101 having a number of guide rails 102 and arranged in the apparatus so that there is a shield 103 above the keyboard. Mounted upon the apparatus is a timer 104 and counters 105 and 106. An electric cable 107 connects the apparatus shown in FIG. 1b with that shown in FIG. 1a. The apparatus in FIG. 1a includes an exercise on a sheet 110 which may be advanced automatically or manually by means of a roller 111 and a representation of a keyboard, which is not normally visible, but which is arranged so that any of the individual key representations may be illuminated and made visible in the manner shown at 112.

Within the apparatus of FIG. 1b there is a punched tape reader, a comparator, and the associated circuitry. There is also a control, not shown, by which means it is possible to adjust the period of delay between the time when a key is operated and a representation is illuminated.

In one method of operation of the apparatus a punched tape, having coded on it an exercise which is presented visibly to an operator by being displayed on the sheet 110, is fed to the tape reader, not shown, so that the first symbol is in the reader and being read. An output from the reader is fed to the comparator, not shown, in accordance with the particular symbol being read. When the operator operates a key a signal is sent to the comparator and depending upon whether or not the key operated corresponds to the symbol read by the reader there is either an output or no output from the comparator. An output from the comparator can be used to give an indication to the operator that the correct key has been operated. For example when the correct sequential operation of a key is made, whereby the particular key operated corresponds to the symbol read by the reader, a sound corresponding to the noise produced by the type face of a typewriter striking a platen is emitted and the operator automatically continues typing. If no sound is emitted the operator knows that a key has been operated in the wrong sequence. In the particular embodiment being described the operation of the wrong key causes a block to be put on the transmission of a signal to the comparator due to the operation of a key, and in order to remove this block it is necessary to operate the back spacing key. Operation of the back spacing key also causes an error counting counter 105 to be energized. Since the counter 106 is energized every time that a key is operated it is possible, by setting the timer 104, to keep a record of the total number of correct and incorrect operations made in a given time and this information may be used in keeping a record of the progress made and act as an incentive. It is also possible for the operation of the back spacing key to cause the representation of the key, which should have been operated, to appear, as illustrated at 112, in a position corresponding to its normal position with respect to the other keys on the keyboard. In one arrangement the whole keyboard representation is visible but the representation of the particular key is illuminated more brightly than the others.

Instead of the representation being made visible immediately upon the operation of the back spacing key it may become visible automatically a given time after the incorrect key has been operated. The time delay may be a constant period in each case, or it may be variable for example by relating it to the rate of typing or the number of mistakes made in a given time, or to a combination of these two factors. For example, the time delay might be longer in a case where the rate of typing is slower than when the rate is faster.

Instead of a representation of the keyboard being made visible it is possible for the keyboard itself to be made visible, either directly or through some optical device.

The source of the exercise provided for comparison, which in the particular embodiment is a punched tape, could be in some other form such as a magnetic tape carrying a signal.

The exercise itself could be presented to the student in another form for example visibly as a projection from a film strip, or audibly from sound recorded on a magnetic tape.

The tape reader for the comparison exercise may be of a conventional type using either mechanical feelers, photocells and beams of light or jets of air to locate the punched holes while if magnetic tape were used it could be a standard magnetic tape reading head.

As a further feature it is possible to provide means to indicate to the operator the home keys upon which the fingers should rest. Such an indication may be given by heating, or vibrating the keys, by passing currents of air through them via flexible tubes as indicated at 108 (FIG. 1b) to impinge on the tips of the operator's fingers, or by specially shaping the keys.

The sound emitted when the correct key is pressed may be produced electrically via an electromechanical transducer and a loudspeaker, and the intensity of the sound produced may be made to correspond to the pressure exerted on the key by the operator so that the correct touch on the keys is indicated by a particular intensity of the sound produced.

The keyboard may be a part of a standard typewriter and the signals to the comparator may be made from a contact unit fitted beneath the keyboard so that the operation of a particular key operates the appropriate contact.

In addition to the use of apparatus according to the invention for helping students in learning to type it is possible for similar apparatus within the scope of the invention to be used, for example, as an aid in teaching students to operate teleprinters, adding machines, machines for punching cards and in learning to read, to spell, to read shorthand, to do arithmetic, and to read braille.

Figure 2B:
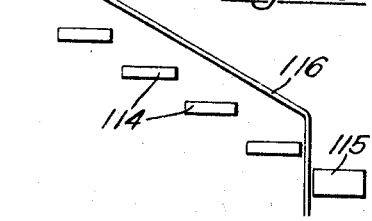
Figure 2C:
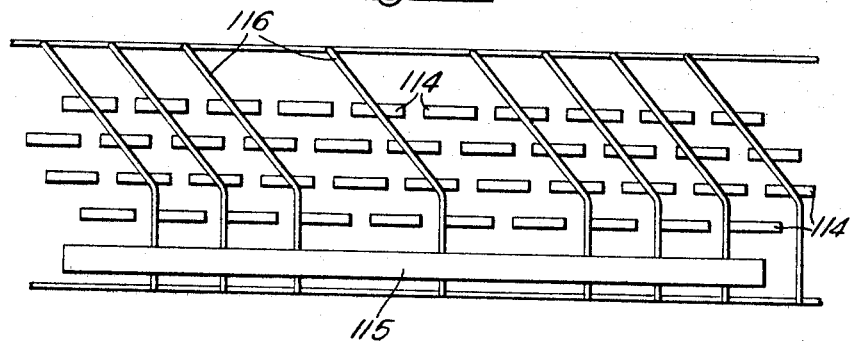

Referring to FIG. 2 there is shown a typewriter keyboard having a number of keys 114, a space bar 115, and a guide which includes a number of cross rails 116 attached to a main rail. The cross rails 116 are arranged to guide each of the fingers of an operator so that, unless a finger crosses over one of the rails 116, it can only operate certain keys. It is therefore made difficult for a finger to operate a key which is generally considered to be not correct for that finger, while allowing the finger ample freedom to operate the keys appropriate to it. The guide may be made as a part of the keyboard or it may be a separate clip-on unit, for example, as a plastics moulding. The rails are shown in the form of simple rods though they may of course be in other forms, for example that of an open fence or as thin sheets.

Figure 3:
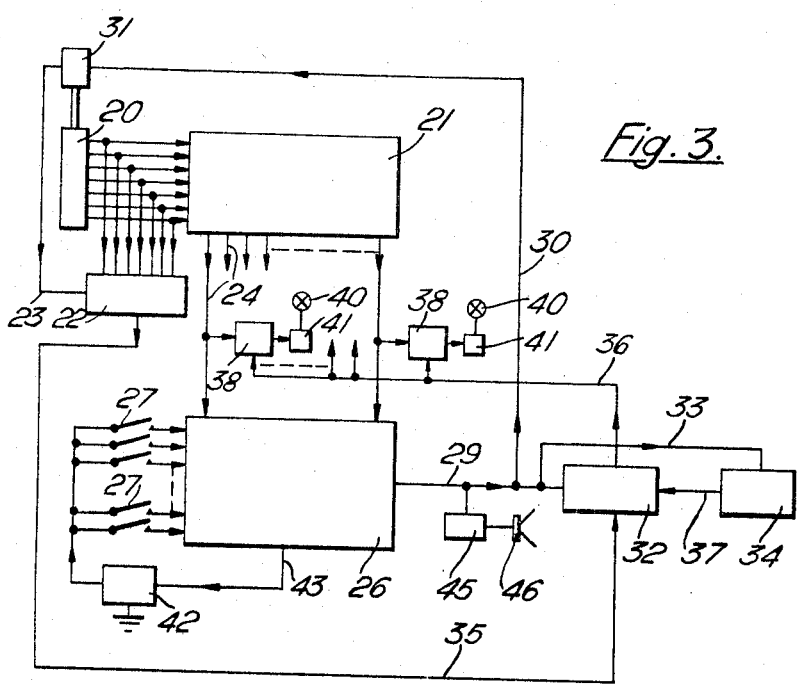
FIG. 3 shows a block schematic diagram of the circuit arrangement of the machine.

Referring to FIG. 3 there is shown a block schematic diagram of a circuit arrangement for the apparatus which includes a punched tape reader 20, a matrix 21 connected to an output from the reader 20 and arranged to translate an alphanumeric code signal input from the reader into a number of outputs each corresponding to a particular symbol, and a gate 22 also connected to the output from the reader 20 and arranged to allow a signal to pass only when the punched tape is moved from the reading position. This gating is achieved by passing a signal from a drive 31 for the tape reader to the gate via path 23 when the tape is in such a position that it presents no holes to the reading head. An output from the matrix 21, corresponding to an alphanumeric code symbol read by the tape reader 20, passes via one of the leads 24 to a comparator or coincidence gate 26. A second input to the coincidence gate 26 is provided from one of the switches 27 associated with a respective key on a typewriter keyboard. The output from the coincidence gate 26 is applied, over the leads 29 and 30 to the drive 31 for the tape reader 20, to a timing circuit 32, and over a lead 33 to an integrator 34. An output from the integrator 34 is connected to an input of the timing circuit 32 over a lead 37. A further input to the timing circuit 32 is connected over a lead 35 from the output of the gate 22. The output from the timing circuit 32 is connected via a lead 36 to a number of gates 38 corresponding to the number of outputs from the matrix 21.

Each of the gates 38 has a second input from respective ones of the leads 24, and an output connected to an associated lamp 40 via a lamp operating circuit 41. The side of each of the switches 27, associated with a respective key on the keyboard, which is not connected to the comparator 26 is connected via a gate 42 to earth, and an output from the coincidence gate 26 is connected to the gate 42 via lead 43.

In operation the tape is positioned in the tape reader 20 so that the first coded symbol is read and the output from the reader is passed to the matrix 21 where it is translated into the corresponding output signal, for example the output for the letter B, where it appears on the appropriate lead 24. The signal on the lead 24 is fed into the coincidence gate 26. At this stage the operator reads the first symbol appearing in the exercise to be typed and since this exercise corresponds to the exercise encoded on the tape the first key to be operated corresponds to the symbol associated with the particular lead 24 on which there is a signal. In the particular example being considered this symbol is the letter B and if the operator operates the key for the letter B then a signal is applied to the coincidence gate 26 from earth via the gate 42 and the appropriate key contact 27. Since the correct key has been operated an output is obtained from the gate 26 on lead 29 and this output causes the tape reader drive 31 to operate and move the tape forward to read the next coded symbol, sets the timing circuit 32 so that it is in readiness to be operated and is amplified in an amplifier 45 the output of which is applied to a loudspeaker 46 to provide a "click" which simulates the sound of a typewriter key being operated. No output is obtained in this situation on the lead 43. A second coded symbol is now read by the reader 20 and a corresponding output is obtained on one of the leads 24 and applied to the gate 26. Now assume that the next key that the operator operates is not for the symbol next in sequence in the exercise visible to the operator and punched in the tape. In these circumstances there will be no coincidence of the inputs from the key 27 and the lead 24 applied to the gate 26 and there will be no output on the lead 29. There will however be an output to the gate 42 via the lead 43 and the gate 42 will be opened so preventing any further input to the gate 26 by the operation of another key until a particular action has been performed by the operator. This action in the arrangement being described is the operation of the back spacing key. The movement of the tape from the first position to the second position will have resulted in a position having been passed through in which all the reading elements were covered at one time by the tape, and it is arranged that when the tape is in this position there is an output from the gate 22 to the timing circuit 32 to start the timing circuit 32 operating. After a period of time determined by a control signal, generated in a manner to be explained later and applied from the integrator 34 to the timing circuit 32, and assuming that no further action is taken by the operator, an output is applied from the timing circuit 32 via the lead 36 to the gates 38. One of the gates 38 also has a signal applied to it from the lead 24 on which there is an output from the matrix 21. This particular gate allows a signal to pass to the lamp operating circuit 41 whereby the lamp associated with the symbol which has been read by the tape reader 20 is illuminated. The lamps are arranged in positions relative to one another so that they simulate a keyboard. When they are illuminated they project light through their respective covers so that in operation the symbol being read by the tape reader 20 becomes visible, after an appropriate delay, in its correct position relative to the other key symbols in this display of a simulated keyboard. As explained with reference to FIG. 1a the display, in the arrangement described, appears as shown at 112.

This display acts as a "prompt" to the operator who can see the relative position of the key which should have been operated with respect to the others, and who after operating the back spacing key can continue typing. The operation of the back spacing key removes the output from the gate 26 via the lead 43 to the gate 42 and causes the moving contacts of the keyboard switches 27 to be reconnected to earth via the gate 42. Assuming that, as a result of the "prompt" that has been given, the key next operated is in the correct sequence, there will be an output from the gate 26, the timing circuit 32 will be reset, the output from the circuit 32 will be removed, the lamp 40 will be extinguished and the tape reader drive will move the tape forward so that the next code combination in the tape is read.

It is a simple matter to arrange for either an output of the gate 26 on the lead 43 or the operation of the back spacing key to cause the error counting counter 105 to operate, and to arrange for an output of the gate 26 on the lead 29 to cause the counter 106 to be energised.

Depending upon the time delay before the "prompt" signal appears it is possible for the operator to beat the prompt by operating both the back spacing key and the correct key before the lamp is illuminated.

The period for which the timing circuit 32 operates to delay the application of a signal over the lead 36 to light one of the lamps 40 is varied according to the control signal applied to it from the integrator 34, and the integrator 34 develops this control signal from the output of the coincidence gate 26 applied to it via the leads 29 and 33.

Figure 4:
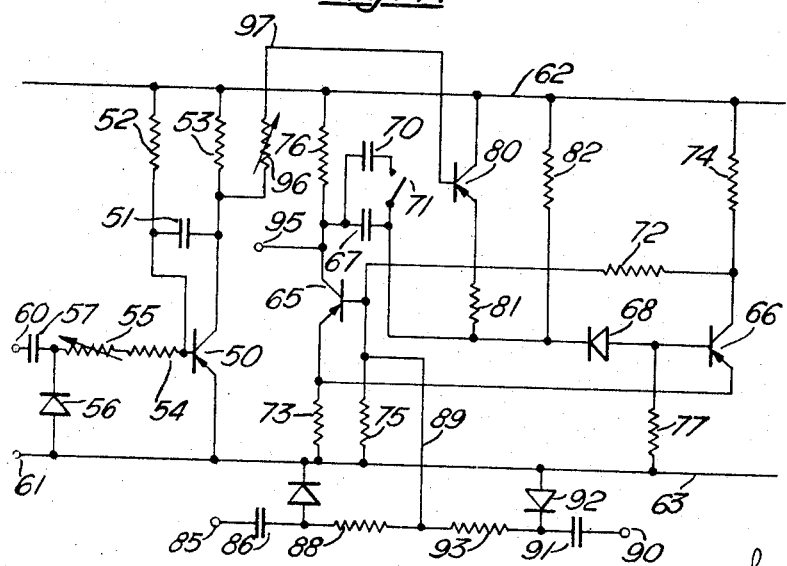
FIG. 4 shows a schematic diagram of a part of the circuit of the machine.

The circuit of the integrator 34 together with that of the timer will now be described with reference to FIG. 4 in which the integrator is a normal Miller integrator including transistor 50, capacitor 51, resistors 52, 53 and 54, variable resistor 55, diode 56 and capacitor 57. The input to the circuit is between terminals 60 and 61. The circuit is connected between a lead 62 and a lead 63 and the lead 62 is 12 volts negative with respect to lead 63.

The timing circuit includes transistors 65 and 66 connected to provide a circuit having two states. The collector of the transistor 65 is connected via a capacitor 67 and a diode 68 to the base of the transistor 66. A capacitor 70 may be additionally connected across the capacitor 67 by means of a switch 71. The base of the transistor 65 is connected via a resistor 72 to the collector of the transistor 66. The emitters of the transistors 65 and 66 are connected together and via a resistor 73 to the lead 63. The collector of the transistor 66 is connected via a resistor 74 to the negative lead 62 and the base of the transistor 65 is connected via a resistor 75 to the lead 63. The collector of the transistor 65 is connected via a resistor 76 to the lead 62 and the base of the transistor 66 is connected to the lead 63 via a resistor 77. A transistor 80 is connected via a resistor 81 between the lead 62 and the junctions between the diode 68 and the capacitor 67. A resistor 82 is also connected between this junction and the lead 62.

An input circuit for a signal to start the timing circuit operating comprises a terminal 85, a capacitor 86, a diode 87, a resistor 88, and a lead 89. An input circuit for a signal to reset the timing circuit comprises a terminal 90, a capacitor 91, a diode 92, a resistor 93, and the lead 89. An output from the timing circuit is obtained from a terminal 95 connected to the collector of the transistor 65. The connection between the integrator circuit and the timing circuit is provided via a variable resistor 96 and a lead 97 connected between the collector of the transistor 50 and the base of the transistor 80.

In operation pulses from the gate 26 (FIG. 3), which are produced when a key has been operated in the correct sequence, are applied between the terminals 60 and 61 (FIGS. 4) at the input to the Miller integrator where they are added, and a signal is thereby provided on the lead 97, connected to the output from the integrator, which is dependent upon the number of keys operated correctly in a given time. The integration period may be varied by varying the value of the variable resistor 55.

The transistor 66 is normally conducting and the transistor 65 is normally nonconducting. The resistance value of the emitter to collector path of the transistor 80 is varied by the variations in the magnitude of the signal applied to the base of the transistor over the lead 97.

A negative going pulse from the gate 22 (FIG. 3) is applied between the terminal 85 and the lead 63 to start the timing circuit. This pulse reaches the base of the transistor 65 and causes it to conduct. The diode 68 is reverse biased and is nonconducting and the transistor 66 is nonconducting. As a result of the transistor 65 conducting the electrode of the capacitor 67 connected to the emitter electrode of the transistor 80 acquires a negative charge from the lead 62 at a rate determined by the effective resistance of the transistor 80 which is in turn determined as explained above by the rate at which the keys are correctly operated. A typical charge period for the capacitor 67 is 5 seconds. When the capacitor 67 is charged a signal is sent via the terminal 95 to the gate 38 (FIG. 3) in order to cause the appropriate lamp to be illuminated. The faster that correct keys are struck the faster does the output from the Miller integrator reach a value to lower the resistance of the transistor 80 and thus the quicker is a signal sent to the gates 38 to illuminate a lamp 40. The operator is thus set the task, automatically varied according to the average speed of typing, of operating the next key in the sequence correctly before a lamp 40 is illuminated. By operating the next key in the sequence correctly a positive going reset pulse from the gate 26 (FIG. 3) is applied over the lead 29 to the terminal 90 of the timing circuit and the timing circuit is reset by stopping the conduction of the transistor 65 and causing the transistor 66 to conduct so that the circuit is in a condition to receive a new negative going pulse from the gate 22 and to start timing. The resistor 96 may be varied to vary the ratio of the average speed of typing to the speed at which the "prompt" signal, provided by the illumination of the lamp 40, is given.

The switch 71 may be closed in order to increase the time constant of the charging circuit in the timer and thus the time delay before a prompt signal is given.

Of course it may be arranged that this automatic timing and "prompting" arrangement are either not included in, or can be disconnected from, the circuit and that a "prompting" indication is given immediately that the back spacing key, or some other appropriate key is operated, after an error has been made. Alternatively the period of delay may be adjusted manually.

It may also be that instead of the "prompt" signal being an illumination of a representation of a key in its correct relation with respect to the other keys, a representation of the whole keyboard is made visible, or an optical projection of the actual keyboard with the operator's hands visible is shown. The "prompt" could be the removal of the screen 103 between the operator and the keyboard by hinging it and raising it into the vertical position so that the keyboard itself becomes visible.

To counters 105 and 106 not shown in FIG. 3 but shown in FIG. 1b are provided to count separately the number of incorrect and correct key operations. A clock type timer 104 is also provided and it has been found that an increase in effort and improved results are given by the challenge involved in reading the counters at given intervals, for example of five minutes, as indicated by the timer, and plotting the readings on a graph. This and the incentive to beat the timing circuit and to prevent the appearance of a "prompt" signal by operating the back spacing key and the correct key before the "prompt" appears have, it is believed, contributed considerably to the success which has been achieved in the use of the apparatus. By the use of the automatically controlled timing circuit it is possible for the machine to adjust itself to the speed of typing and to avoid the frustration of "prompt" signals appearing so quickly that a slow typist could not possibly beat them or so slowly as to hinder an operator who has previously been working quickly and accurately.

Although electrical and mechanical apparatus have been used in the particular embodiment described other analogous means, for example hydraulic apparatus could be used to replace either or both of these apparatus.

In the particular arrangement described the electromechanical converter which provides an electrical signal in accordance with the operation of a key is a simple switch, although of course this converter could be a more complicated device which provides a coded electrical signal for each key in a similar manner to that of a teleprinter or Teletype machine, and this coded signal could be such that it may be compared directly with the code from the source. Alternatively, a converter may be used to convert one of the signals so that it is comparable with the other.

There has thus been provided by the present invention an arrangement having the following features:

I. A keyboard corresponding to the keyboard of the instrument which the trainee is to operate;

II. A reader capable of advancing step by step the exercise presented to the student;

III. A display representing the special relationship of the keys on the keyboard; the display being so arranged that it can represent a single key at a time;

IV. A comparator which operates only when the key struck and the character being read by the reader are in correspondence;

V. A time delay which causes the display to indicate the correct key to be struck at some time interval after the reader has advanced to a new character; the time delay being variable *either* manually at the wish of the trainee or instructor *or* automatically by a device which adjusts the delay in relation to the recent average speed with which the trainee strikes correct keys, such that the delay is shortened as the average speed increases.

We claim:

1. Apparatus for use in learning keyboard skills including a keyboard, a comparator, a source containing elements of information representing characters stored in a predetermined sequential manner, means to present first signals, each corresponding to one of the characters, in the predetermined sequential manner from the source to the comparator, in which respective ones of the keys on the keyboard represent respective ones of the characters, an electromechanical converter to provide a second electrical signal corersponding to an operated key, means to present the second signals to the comparator, indicator means responsive to the output from the comparator to give an indication to the operator when there is no coincidence between the first and second signals, means to instruct a time delay into the response of the indicator means to the output of the comparator and means responsive to the rate at which said keys are operated and connected to said time delay means to vary the amount of delay in accordance with the said rate.

2. Apparatus as claimed in claim 1, in which the means to vary the time delay includes a timing circuit connected to a capacitor and arranged to charge the capacitor when operated, a gate circuit connected to the capacitor and arranged to allow the indication to be given when the charge on the capacitor has reached a given level, and an integrator circuit connected to an output from the comparator and arranged to produce an output signal related to the rate at which keys are opearted in the correct sequence, which output signal is applied to vary the rate of charging of the capacitor in such a way that the capacitor charges more quickly the higher the rate at which keys are operated in the correct sequence.

3. Apparatus as claimed in claim 1, in which the means to give an indication to the operator includes means to prevent the further operation of the apparatus until the correct key has been operated.

4. Apparatus as claimed in claim 2, in which the means to prevent the further operation of the apparatus includes a gate connected in such a way that in one condition it disconnects an earth supply from the comparator.

5. Apparatus as claimed in claim 1, including an electromechanical converter coupled to the keys in order to provide the second signal as an electrical signal, and means to provide the first signal as an electrical signal corresponding to a character stored in the source.

6. Apparatus as claimed in claim 1, which includes an electromechanical transducer connected to the output of the comparator and arranged to produce an audible sound when a key is operated in the correct sequence.

7. Apparatus as claimed in claim 1, which includes means to indicate to the operator which of the keys are the home keys upon which the fingers should rest.

8. Apparatus for use in learning keyboard skills including a keyboard, a comparator, a source containing elements of information representing characters stored in a predetermined sequential manner, means to present first signals, each corresponding to one of the characters, in the predetermined sequential manner from the source to the comparator, in which respective ones of the keys on the keyboard represent respective ones of the characters, means to present second signals, each corresponding to one of the keys when operated, to the comparator, a permanent graphic display of the characters stored in the source set out in the sequence of the stored information in a required manner and visible to an operator, and means to give an indication to the operator when there is no coincidence between the first and scond signals applied ot the comparator, the means to give an indication to the operator including means which provides a "prompt" in a visual manner automatically a predetermined period of time after a key has been operated in the wrong sequence in order to give the operator an indication of the position of the key which should have been operated, the predetermined period of time depending upon the rate at which keys are operated in the correct sequence, wherein when keys are operated according to the sequence set out in the permanent graphic display there is presented to the comparator a series of first signals corresponding to the characters in the display and a series of second signals corresponding to the sequence of the operation of the keys and an output is obtained from the comparator indicative of coincidence of each of the corresponding first and second signals in the series and when a key is operated in a sequence not in accordance with that of the characters in the display and there is no coincidence between the first and second signals applied to the comparator the said indication is given to the operator.

References Cited

UNITED STATES PATENTS

| 1,377,070 | 4/1921 | Helguera | 35—5 |
| 2,053,874 | 9/1936 | O'Donnell | 35—5 |
| 2,947,087 | 8/1960 | Arnold et al. | 35—9 |
| 3,095,654 | 7/1963 | Cummings | 35—6 |
| 3,100,351 | 8/1963 | Priednieks et al. | 35—6 |
| 3,114,210 | 12/1963 | Uttal | 35—6 |
| 3,166,856 | 1/1965 | Uttal | 35—6 |
| 3,234,664 | 2/1966 | Yaeger | 35—6 |
| 3,261,111 | 7/1966 | Johnston et al. | 35—6 |
| 3,277,587 | 10/1966 | Holcombe | 35—5 |

FOREIGN PATENTS 771,162   3/1957   Great Britain.

EUGENE R. CAPOZIO, *Primary Examiner.*

W. W. NIELSEN, *Assistant Examiner.*